US008316222B2

(12) United States Patent
Braun et al.

(10) Patent No.: US 8,316,222 B2
(45) Date of Patent: Nov. 20, 2012

(54) METHOD OF PROVIDING DATA ACCESS IN AN INDUSTRIAL AUTOMATION SYSTEM, COMPUTER PROGRAM PRODUCT AND INDUSTRIAL AUTOMATION SYSTEM

(75) Inventors: Ulrich Braun, Nürnberg (DE); Peter Kob, Heroldsberg (DE); George Lo, Plainsboro, NJ (US)

(73) Assignee: Siemens AG, Munich (DE)

( * ) Notice: Subject to any disclaimer, the term of this patent is extended or adjusted under 35 U.S.C. 154(b) by 283 days.

(21) Appl. No.: 12/711,714

(22) Filed: Feb. 24, 2010

(65) Prior Publication Data
US 2010/0222896 A1 Sep. 2, 2010

(30) Foreign Application Priority Data
Feb. 27, 2009 (EP) .................................. 09002828

(51) Int. Cl.
*G06F 9/00* (2006.01)
*G05B 11/01* (2006.01)
(52) U.S. Cl. ................. 713/1; 700/19; 700/20
(58) Field of Classification Search .................. 713/2, 1; 700/20, 19
See application file for complete search history.

(56) References Cited

U.S. PATENT DOCUMENTS

| | | |
|---|---|---|
| 2004/0015701 A1 | 1/2004 | Flyntz |
| 2005/0028189 A1* | 2/2005 | Heine et al. ............. 725/20 |
| 2005/0125361 A1* | 6/2005 | Girsham et al. ............. 705/71 |
| 2007/0169071 A1* | 7/2007 | Martin et al. ............. 717/166 |
| 2008/0086643 A1* | 4/2008 | Balasubramanian et al. 713/182 |
| 2008/0189536 A1 | 8/2008 | Mann |
| 2010/0201480 A1* | 8/2010 | Falk et al. ............. 340/5.8 |

FOREIGN PATENT DOCUMENTS

| | | |
|---|---|---|
| EP | 1 414 216 | 4/2004 |
| EP | 1 962 159 | 8/2008 |

OTHER PUBLICATIONS

Mick, Robert O., "Client/Server Computing Comes to the Plant Floor", Control Solutions, Pennwell Publishing, vol. 66, No. 9 (1993), pp. 41-42 and 47-49.

* cited by examiner

Primary Examiner — Chun Cao
(74) Attorney, Agent, or Firm — Cozen O'Connor

(57) ABSTRACT

In an industrial automation system comprising a plurality of industrial control devices connected to an industrial communication network, control and/or supervision functions of the industrial automation system are provided by services implemented by computer-based objects in industrial control devices. A computer-based object is assigned a first qualifier enabling the computer-based object to be accessed and/or modified during configuration of the respective service and/or a second qualifier enabling the computer-based object to be accessed and/or modified during runtime of the respective service. Upon a request for access to a computer-based object by a service consumer, the service consumer's operational state is determined. Depending on a set first and/or second qualifier of a computer-based object and depending on a determined operational state of a service consumer, access to the computer-based object is granted to the service consumer.

19 Claims, 2 Drawing Sheets

METHOD OF PROVIDING DATA ACCESS IN AN INDUSTRIAL AUTOMATION SYSTEM, COMPUTER PROGRAM PRODUCT AND INDUSTRIAL AUTOMATION SYSTEM

BACKGROUND OF THE INVENTION

The present invention relates to a method of providing data access in an industrial automation system, a computer program product, and to an industrial automation system.

Due to a steadily increasing impact of information technology on industrial automation systems, methods of safeguarding components of an industrial automation system, such as monitoring devices, open-loop and closed-loop control devices, sensors and actuators, against unauthorised access are becoming a crucial factor. Compared to other fields of technology, data integrity is extremely important for a stable and reliable operation of industrial automation systems. Especially when collecting, evaluating and transmitting measured data and control commands, care has to be taken to ensure that measured data and control commands are transmitted completely and without any manipulation. Therefore, intentional and unintentional modifications of control messages in industrial automation systems are to be avoided, especially in system or component failure scenarios.

Moreover, communication in industrial automations systems is characterised by a large amount of relatively short messages. This requires high efforts to ensure data integrity and consistent system operation. Further efforts result from real-time requirements in industrial automation systems when collecting and processing measured data and control messages pertaining to time-critical technical processes, e.g., in factory or building automation.

Industrial automation systems that are based on service-oriented architectures often require the application of fine-granular and high-sophisticated access control policies. Usually, such access control policies do not just have to be applied to users in an industrial automation system, but also to services provided in industrial automation systems increasing the complexity of defining and managing access control policies. Usually, additional measures must be taken to avoid negative side-effects on system performance.

Additionally, in many scenarios a clear separation of configuration data and runtime data is required to realize consistent and safety-relevant access in an industrial automation system. In accordance with prior known solutions, stable data has been compiled and thereby made static. Alternatively, configuration data has been pre-defined at design time. Therefore, configuration data and runtime data has been stored separately in different data repositories. Accordingly, access control in conventional systems has been made by convention or programming. This usually results in making access control less flexible with regard to modifying access control policies and more error-prone.

SUMMARY OF THE INVENTION

It is therefore an object of the present invention to provide an efficient method of providing data access in an industrial automation system enabling consistent and scalable access control.

This and other objects and advantages are achieved in accordance with the invention by a method of providing data access in an industrial automation system comprising a plurality of industrial control devices connected to an industrial communication network. Control and/or supervisory functions of the industrial automation system are provided by services that are implemented by computer-based objects in industrial control devices. Computer-based object can comprise operation systems, control or application programs, services, functions, procedures or features provided by operation systems, control or application programs and access rights for accessing control and peripheral devices as well as data stored on a storage medium. Further, a computer-based object is assigned a first qualifier enabling the computer-based object to be accessed and/or modified during configuration of the respective service and/or a second qualifier enabling the computer-based object to be accessed and/or modified during runtime of the respective service. The first and/or second qualifier may be set upon instantiation of the computer-based object. Upon a request for access on a computer-based object by a service consumer, the service consumer's operational state is determined. Depending on a set first and/or second qualifier of a computer-based object and depending to a determined operational state of a service consumer, access to the computer-based object is granted to the service consumer.

In an embodiment of the present invention, the service consumer's operational state is characterized by the service consumer's application context. The application context may be set explicitly or implicitly. In a preferred embodiment of the present invention, the application context is either configuration or dynamic modification.

In accordance with a further embodiment of the present invention, read and write access to a computer-based object is granted, if the computer-based object is assigned a first qualifier and the application context of the service consumer is configuration. Preferably, read and write access to a computer-based object is granted, if the computer-based object is assigned a second qualifier and the application context of the service consumer is dynamic modification. Moreover, only read access to a computer-based object may be granted, if the computer-based object is assigned a first qualifier and the application context of the service consumer is dynamic modification, or if the computer-based object is assigned a second qualifier and the application context of the service consumer is configuration.

In accordance with a still further embodiment of the present invention, the first and/or second qualifier is inherited from a base class. If the computer-based object is an attribute of an object instance, the first and/or second qualifier may be inherited from the object instance. This may apply to every attribute of the object instance. Furthermore, the first and/or second qualifier may be inherited from an object class by every object instance belonging to the object class.

In accordance with a yet further preferred embodiment of the present invention, a computer-based object is a single class object whose components are stored separately in different storage locations depending on their association with a first or second qualifier. Here, components associated with a first qualifier may be stored in a storage location for persistent data, whereas components associated with a second qualifier may be stored in a storage location for volatile data.

In accordance with a further embodiment of the present invention, services of the industrial automation system are provided within a service-oriented architecture. A service-oriented architecture provides methods for systems integration and enables structuring large applications as an ad hoc collection of smaller modules which implement interoperable services. Service-orientation aims at a rather loose coupling of services with operating systems, programming languages and other technologies which underlie applications. Besides, service-orientation further aims at making coupled services usable by authorised users or services. Moreover, service-oriented architectures enable application integration by hiding complexity of individual components of an industrial automation system behind standardised interfaces. As a result, a secure and flexible provisioning of control and monitoring functionality is provided in industrial automation systems, thereby improving total system-quality.

In accordance with a still further embodiment of the present invention, the industrial automation system is a manufacturing, industrial, process or building automation system. Further, the industrial control devices may be programmable.

A further aspect of the present invention relates to a computer program product which is loadable into a random-access memory of a computer and comprising computer program code means causing the computer to execute the above-mentioned steps. Yet another aspect of the present invention relates to an industrial automation system comprising a plurality of industrial control devices for providing control and/or supervision functions of the industrial automation system by means of services implemented by computer-based objects. The control devices are connected to an industrial communication network. Moreover, the industrial automation system comprises means of executing above-mentioned steps.

Other objects and features of the present invention will become apparent from the following detailed description considered in conjunction with the accompanying drawings. It is to be understood, however, that the drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein.

BRIEF DESCRIPTION OF THE DRAWINGS

These and other aspects of the present invention will be apparent from and elucidated with reference to the embodiments hereinafter. It should be noted that the use of reference designators in the drawings or otherwise shall not be construed as limiting the scope of the invention, in which.

DETAILED DESCRIPTION OF THE PRESENTLY PREFERRED EMBODIMENTS

Figure 1:
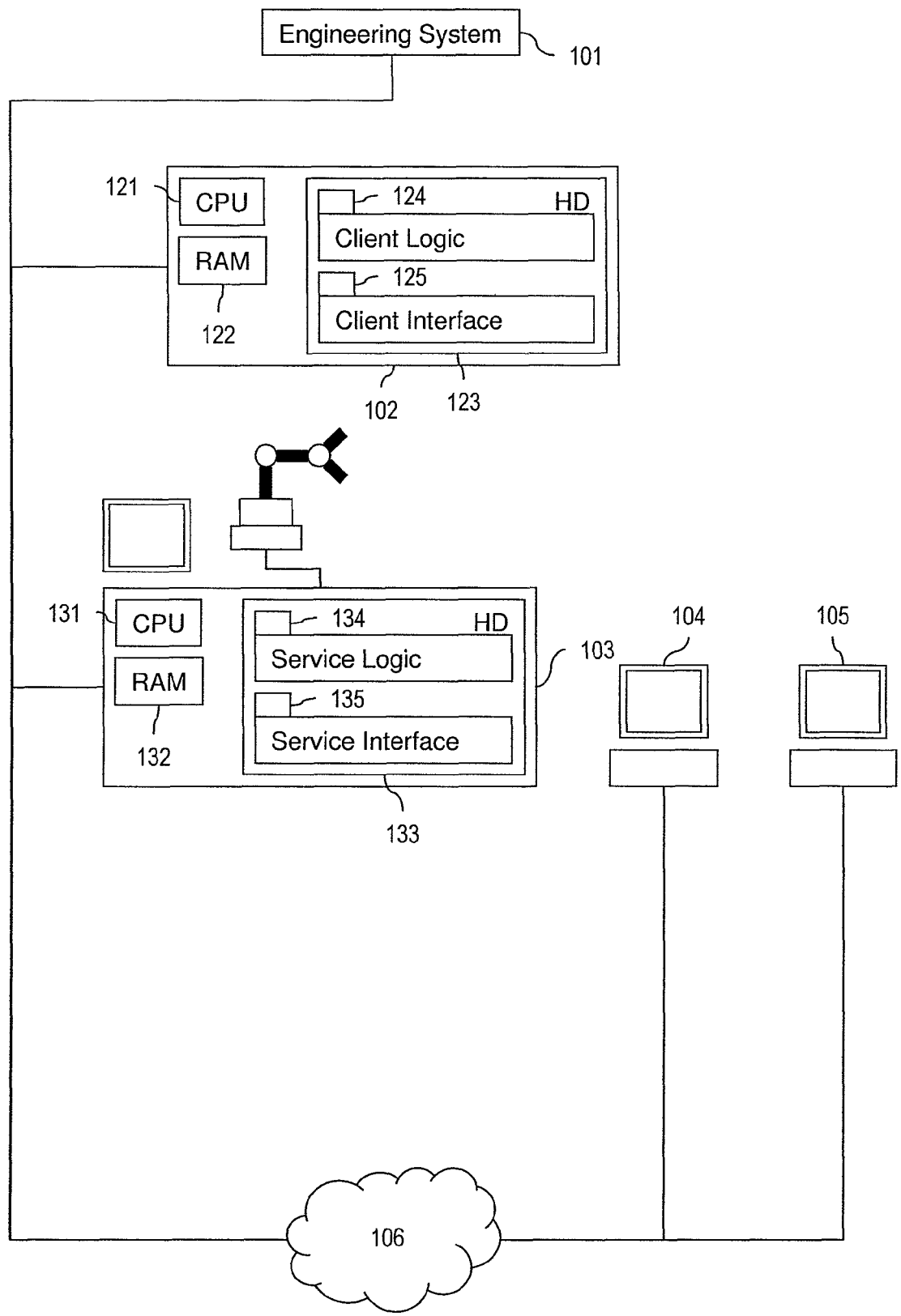
FIG. 1 shows a schematic diagram of an industrial automation system in accordance with an embodiment of the present invention.

The industrial automation system depicted in FIG. 1 comprises an engineering system 101, a client computer 102 and a plurality of programmable industrial control devices 103-105 which are connected to an industrial communication network 106. The industrial control devices 103-105 provide control and supervision functions as local services of the industrial automation system for managing industrial processes. Industrial processes include, e.g., manufacturing, production, power generation, fabrication and refining and may run in continuous, batch, repetitive or discrete modes.

The engineering system 101 is configured to plan and execute configuration, maintenance, commissioning and documentation tasks within the industrial automation system. Particularly, the engineering system 101 provides configuration data to the industrial control devices 103-105. The configuration data comprises information on allocation of local services to industrial control devices 103-105 and information on dependencies between local services.

The client computer 102 and the industrial control devices 103-105 each comprise at least a processor 121, 131 for executing program code and a storage device 123, 133 for persistently storing program code, application data and user data. The storage device 123 of the client computer 102 comprises program code 124 for providing a client application and program code 125 for implementing a client application programming interface. In accordance with the presently contemplated embodiment, the client application implements a supervisory system for presenting industrial process data to a human operator. Thus, the human operator is enabled to monitor and control the underlying industrial process. Further, the supervisory system aggregates and processes data on the industrial process collected by sensors connected to the industrial control devices 103-105 and sends process control commands to actuators coupled to the underlying industrial process and associated with the industrial control devices 103-105.

The storage device 133 of the industrial control device 103 comprises program code 134 for providing a local service and program code 135 for implementing a service interface interacting with the client application programming interface. In accordance with the presently contemplated embodiment, the local service serves to control and monitor sensors and actuators as peripheral devices connected to the industrial control device 103. Sensors and actuators may also be combined in a device, such as a robot. Moreover, an industrial control device 103-105 may be designed and configured to monitor and control the volumetric current, pressure or temperature of a streaming liquid in an industrial process. Here, a supervisory system allows a human operator to change set points for the streaming liquid and to set alarm thresholds for monitoring and managing critical events.

The program code 124, 125, 134, 135 is loadable into a random-access memory 122, 132 of the client computer 102 and the industrial control device 103, respectively. Then the program code 124, 125, 134, 135 can be executed by the processors 121, 131 to cause the executing of at least above-mentioned steps.

Figure 2:
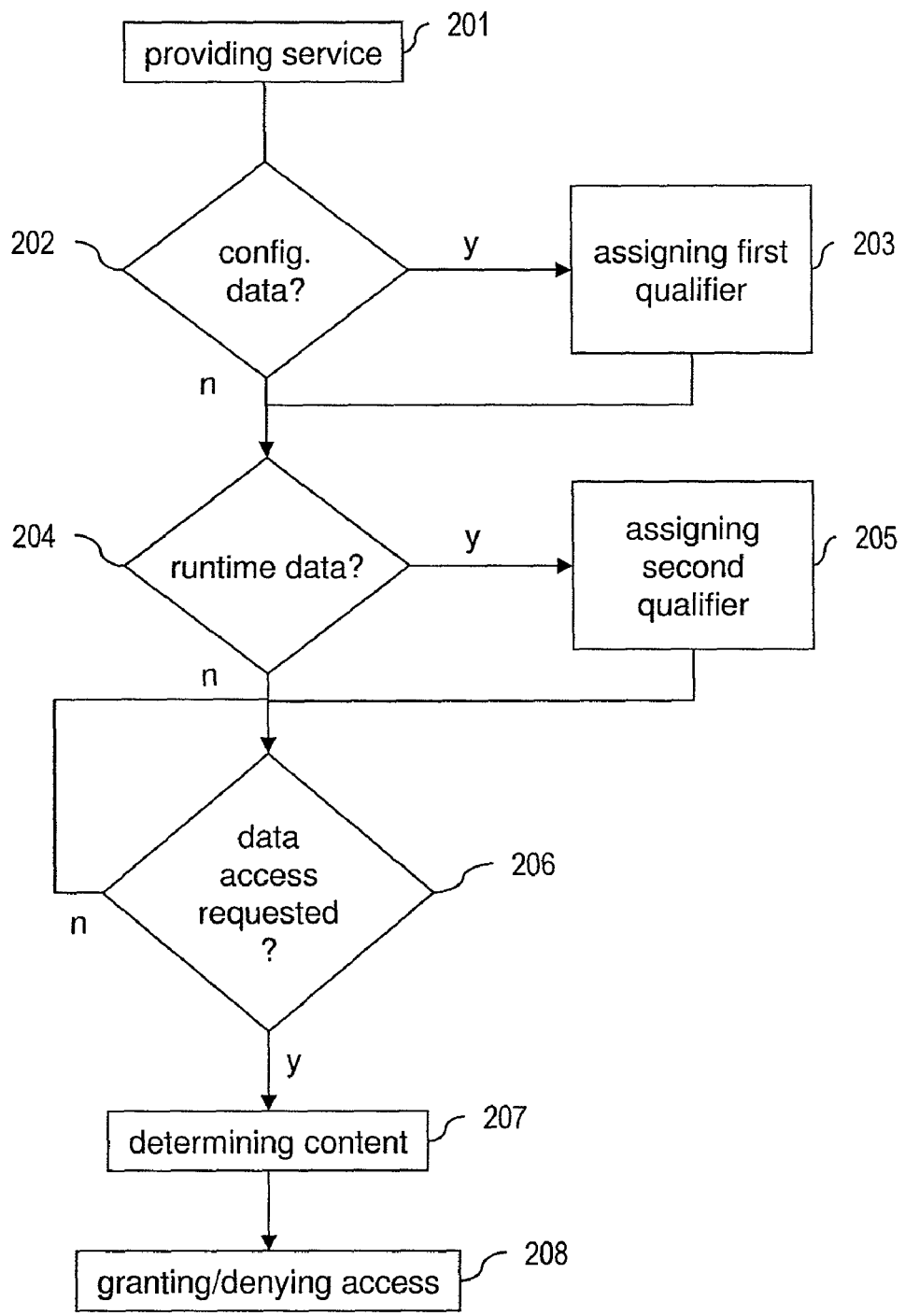
FIG. 2 shows a flow chart of a method in accordance with an embodiment of the present invention.

Turning to the flow chart illustrated in FIG. 2, in an industrial automation system comprising a plurality of industrial control devices connected to an industrial communication network, control and supervision functions are provided by services implemented by computer-based objects in industrial control devices 103-105 (step 201). If a computer-based object to be accessed in the industrial control system constitutes configuration data (step 202), then a first qualifier is assigned to the computer-based object enabling the computer-based object to be accessed and modified during configuration of the respective service (step 203). Otherwise, if the computer-based object constitutes runtime data (step 204), then a second qualifier is assigned to the computer-based object enabling the computer-based object to be accessed and modified during runtime of the respective service (step 205).

Upon a request for access on the computer-based object by a service consumer (step 206), the service consumer's operational state is determined (207). In the present embodiment, the operational state is reflected by the service consumer's application context which is either configuration or dynamic modification.

Depending on whether the first or second qualifier is set, and depending on the context of the service consumer, access to the computer-based object is granted to the service consumer or denied (step 208).

The following table shows possible modes of access on the computer-based object in selected scenarios:

| Qualifier assigned | Context: configuration | Context: dynamic modification |
| --- | --- | --- |
| First only | Read and write | Read only |
| Second only | Read only | Read and write |
| Both | Read and write | Read and write |

In accordance with the above table, read and write access to the computer-based object is granted, if the computer-based object is assigned a first qualifier and the application context of the service consumer is configuration. Further, read and write access to the computer-based object is granted, if the computer-based object is assigned a second qualifier and the application context of the service consumer is dynamic modification. In contrast, read only access to the computer-based object is granted, if the computer-based object is assigned a first qualifier and the application context of the service consumer is dynamic modification. This also applies, if the computer-based object is assigned a second qualifier and the application context of the service consumer is configuration.

A first qualifier should be assigned to a computer-based object representing data that should only be allowed to be changed by configuration. In contrast, a second qualifier should be assigned to a computer-based object representing slow changing values in an industrial automation system that should not be overridden by configuration. Moreover, both qualifiers may be assigned, if a computer-based object represents data that originates from configuration and can be changed during runtime, especially if the data change rate is very slow.

Scope and applicability of the present invention are not limited to the described embodiments of the present invention. Modifications of the present invention without departing from its scope are known to one skilled in the art.

Thus, while there are shown, described and pointed out fundamental novel features of the invention as applied to preferred embodiments thereof, it will be understood that various omissions and substitutions and changes in the form and details of the illustrated apparatus, and in its operation, may be made by those skilled in the art without departing from the spirit of the invention. Moreover, it should be recognized that structures shown and/or described in connection with any disclosed form or embodiment of the invention may be incorporated in any other disclosed or described or suggested form or embodiment as a general matter of design choice.

What is claimed is:

1. A method for providing data access in an industrial automation system comprising a plurality of industrial control devices connected to an industrial communication network, the method comprising the steps of:
   providing at least one of control and supervision functions of the industrial automation system by services implemented by computer-based objects in industrial control devices;
   assigning a computer-based object at least one of a first qualifier enabling access or modification of the computer-based object during configuration of a respective service and a second qualifier enabling the access or the modification of the computer-based object during runtime of the respective service;
   upon a request for access on the computer-based object by a service consumer, determining an operational state of a service consumer; and
   depending on at least one of a set first and set second qualifier of the computer-based object and depending on the determined operational state of the service consumer, granting the service consumer with access to the computer-based object.

2. The method according to claim 1, wherein the at least first and second qualifier is set upon instantiation of the computer-based object.

3. The method according to claim 1, wherein the operational state is characterized by a context of an application of the service consumer.

4. The method according to claim 2, wherein the operational state is characterized by a context of an application of the service consumer.

5. The method according to claim 3, wherein the context of the application is set one of explicitly and implicitly.

6. The method according to claim 5, wherein the context of the application comprises one of configuration modification and dynamic modification.

7. The method according to claim 6, wherein said granting step comprises granting read and write access to the computer-based object, if the computer-based object is assigned the first qualifier and the context of the application of the service consumer is configuration modification.

8. The method according to claim 6, wherein said granting step comprises granting read and write access to the computer-based object, if the computer-based object is assigned the first qualifier and the context of the application of the service consumer is dynamic modification.

9. The method according to claim 7, wherein said granting step comprises granting read and write access to the computer-based object, if the computer-based object is assigned the first qualifier and the context of the application of the service consumer is dynamic modification.

10. The method according to claim 6, wherein said granting step comprises granting only the read access to the computer-based object, if one of the computer-based object is assigned the first qualifier and the context of the application of the service consumer is dynamic modification and if the computer-based object is assigned the second qualifier and the context of the application of the service consumer is configuration modification.

11. The method according to claim 7, wherein said granting step comprises granting only read access to the computer-based object, if one of the computer-based object is assigned the first qualifier and the context of the application of the service consumer is dynamic modification and if the computer-based object is assigned the second qualifier and the context of the application of the service consumer is configuration modification.

12. The method according to claim 1, wherein at least one of the first and second qualifier is inherited from a base class.

13. The method according to claim 1, wherein the computer-based object comprises a single class object having components which are stored separately in different storage locations depending on an association of the single class object with one of the first and second qualifier.

14. The method according to claim 13, wherein components associated with the first qualifier are stored in a storage location for persistent data and components associated with the second qualifier are stored in a storage location for volatile data.

15. The method according to claim 1, wherein services of the industrial automation system are provided within a service-oriented architecture.

16. The method according to claim 1, wherein the industrial automation system comprises one of a manufacturing, industrial process and building automation system.

17. The method according to claim 1, wherein the industrial control devices are programmable.

18. A process in which a computer apparatus executes instructions set forth in a computer program executing on a processor, which when used on the computer apparatus causes data access in an industrial automation system comprising a plurality of industrial control devices connected to an industrial communication network, the computer program comprising:
- program code for providing at least one of control and supervision functions of the industrial automation system by services implemented by computer-based objects in industrial control devices;
- program code for assigning a computer-based object at least one of a first qualifier enabling access or modification of the computer-based object during configuration of a respective service and a second qualifier enabling the access or the modification of the computer-based object during runtime of the respective service;
- program code for, upon a request for access on the computer-based object by a service consumer, determining an operational state of a service consumer; and
- program code for depending on at least one of a set first and set second qualifier of the computer-based object and depending on the determined operational state of the service consumer, granting the service consumer with access to the computer-based object.

19. An industrial automation system comprising:
- a plurality of industrial control devices for at least one of providing control and supervision functions of the industrial automation system by services implemented by computer-based objects, the control devices being connected to an industrial communication network;
- means for assigning a computer-based object at least one of a first qualifier enabling access or modification of the computer-based object during configuration of a respective service and a second qualifier enabling the access or the modification of the computer-based object during runtime of the respective service;
- means for determining, upon a request for access on the computer-based object by a service consumer, an operational state of a service consumer; and
- means for granting, depending on at least one of a set first and set second qualifier of the computer-based object and depending on the determined operational state of the service consumer, the service consumer with access to the computer-based object.

* * * * *